(12) United States Patent
Osterhouse et al.

(10) Patent No.: US 9,989,054 B2
(45) Date of Patent: Jun. 5, 2018

(54) COMPACT ULTRAHIGH PRESSURE DYNAMIC SEAL ASSEMBLY WITH PRESSURE ACTIVATING BACKUP RING

(71) Applicant: Hypertherm, Inc., Hanover, NH (US)

(72) Inventors: David Osterhouse, Minneapolis, MN (US); Eric J. Chalmers, Minneapolis, MN (US); Jon W. Lindsay, Hanover, NH (US); Arion Vandergon, St. Louis Park, MN (US); Cedar J. Vandergon, New Brighton, MN (US)

(73) Assignee: Hypertherm, Inc., Hanover, NH (US)

( * ) Notice: Subject to any disclaimer, the term of this patent is extended or adjusted under 35 U.S.C. 154(b) by 151 days.

(21) Appl. No.: 14/641,822

(22) Filed: Mar. 9, 2015

(65) Prior Publication Data

US 2015/0252801 A1    Sep. 10, 2015

Related U.S. Application Data

(60) Provisional application No. 61/949,798, filed on Mar. 7, 2014.

(51) Int. Cl.
*F04B 53/16* (2006.01)
*F16J 15/18* (2006.01)
*F16J 15/16* (2006.01)
*F16J 15/56* (2006.01)

(52) U.S. Cl.
CPC .......... *F04B 53/164* (2013.01); *F16J 15/164* (2013.01); *F16J 15/166* (2013.01); *F16J 15/181* (2013.01); *F16J 15/56* (2013.01); *Y10T 29/49297* (2015.01)

(58) Field of Classification Search
CPC ...... F04B 53/164; F16J 15/164; F16J 15/166; F16J 15/181; F16J 15/56; Y10T 29/49297
See application file for complete search history.

(56) References Cited

U.S. PATENT DOCUMENTS

| 3,300,225 | A | 1/1967 | Shepler |
| 5,493,954 | A | 2/1996 | Kostohris et al. |
| 6,162,031 | A * | 12/2000 | Tremoulet, Jr. ...... F04B 53/164 277/584 |
| 6,802,541 | B2 | 10/2004 | Hopkins et al. |
| 7,247,006 | B2 | 7/2007 | Hopkins et al. |
| 7,568,424 | B2 | 8/2009 | Hopkins et al. |
| 2003/0111801 | A1 | 6/2003 | Stephens |
| 2008/0019851 | A1 * | 1/2008 | Hopkins ................. F04B 53/02 417/415 |
| 2014/0015202 | A1 | 1/2014 | Chacko et al. |

FOREIGN PATENT DOCUMENTS

| GB | 1103013 A | 2/1968 |
| WO | 2013/109474 A1 | 7/2013 |

* cited by examiner

*Primary Examiner* — David Bryant
*Assistant Examiner* — Lee A Holly
(74) *Attorney, Agent, or Firm* — Proskauer Rose LLP (57) ABSTRACT

The invention features a seal assembly for a high pressure liquid system. The seal assembly includes a seal carrier having abuse portion defining a proximal end, a distal end, and a bore. The seal carrier also includes a seal disposed within the bore of the seal carrier. The seal carrier also includes a backup ring disposed within the bore of the seal carrier. The seal carrier also includes a hoop ring disposed substantially between the seal and the backup ring, the hoop ring having a proximal surface and an outer surface.

28 Claims, 9 Drawing Sheets

PROTOTYPE COMPACT SEAL ASSEMBLY
AXIAL LENGTH = 0.712"

FLOW (PRIOR ART) SEAL ASSEMBLY
AXIAL LENGTH = 1.035"

COMPACT ULTRAHIGH PRESSURE DYNAMIC SEAL ASSEMBLY WITH PRESSURE ACTIVATING BACKUP RING

CROSS REFERENCE TO RELATED APPLICATIONS

This application is a non-provisional of U.S. Provisional Patent Application No. 61/949,798, filed on Mar. 7, 2014 and entitled "Compact Ultrahigh Pressure Dynamic Seal Assembly with Pressure Activating Backup Ring." The contents of this application are incorporated herein by reference in their entirety.

FIELD OF THE INVENTION

The invention relates generally to the field of liquid pressurization systems and processes. More specifically, the invention relates to methods and apparatuses for improving seal assemblies operating in high-pressure intensifier pumps.

BACKGROUND

Liquid pressurization systems produce high pressure (e.g., up to 90,000 pounds per square inch or greater) streams of liquid for various applications. For example, high pressure liquid may be delivered to a liquid jet cutting head, a cleaning tool, a pressure vessel or an isostatic press. In the case of liquid jet cutting systems, liquid is forced through a small orifice at high velocity to concentrate a large amount of energy on a small area. To cut hard materials, a liquid jet can be "abrasive" or include abrasive particles for increasing cutting ability. As used herein, the term "liquid jet" includes any substantially pure water jet, liquid jet, and/or slurry jet. However, one of ordinary skill in the art would easily appreciate that the invention applies equally to other systems that use liquid pumps or similar technology.

To generate a high pressure liquid stream, a liquid pressurization system uses a high-pressure intensifier pump. A high-pressure intensifier pump uses a plunger to draw a volume of liquid into a cylinder on an intake stroke and pressurize the volume of liquid on a pressure stroke. As the plunger reciprocates within the cylinder, it passes through a seal assembly. The seal assembly prevents pressurized liquid in the cylinder from flowing past the plunger and leaking from the pump. Typically, a pump has multiple cylinders, and pressurized fluid from an outlet area of each cylinder is collected in an accumulator. High-pressure fluid collected in this manner is then provided to a tool to perform a desired function, e.g., cutting or cleaning.

While seal assemblies are critical to the proper functioning of the intensifier pump, current seal assemblies suffer from at least two significant drawbacks. First, current seal assemblies are bulkier than necessary. Added bulk can waste space in the pump and raise manufacturing costs. Second, current seal assemblies wear significantly with pump use and therefore require frequent replacement. What is needed is a seal assembly that is compact, robust, and easy to install—and that has a long service life and a low manufacturing cost.

SUMMARY OF THE INVENTION

The present invention meets these needs using a new pressure activating backup ring design that extends seal operating life and enables a more compact seal assembly structure. The seal assembly includes a seal carrier, a seal, a hoop ring and a backup ring. The backup ring "floats" freely in the seal carrier after installation in the intensifier pump (e.g., does not maintain direct physical contact with the seal carrier). In some embodiments, a face of the backup ring is tilted with respect to the seal so that, when compressed, the backup ring closes around an outer diameter of the plunger as the seal assembly is exposed to highly pressurized fluid during the intensifier pump pressure stroke. In some embodiments, the tilted surface is located elsewhere in the seal assembly, e.g., on a face of a press-fit plug that secures seal assembly components in the seal assembly. The pressure-activating backup ring can minimize seal material extrusion between the plunger and the backup ring, allowing seal life to be extended.

In some embodiments, the backup ring has an inner diameter that has a clearance relative to an outer diameter of the plunger, allowing the seal assembly to be easily installed on the plunger. In some embodiments, the hoop ring provides a buffer between the seal, the seal carrier and the backup ring and helps to minimize extrusion of seal material between the seal carrier and the backup ring. In some embodiments, seal material and water that leak between the backup ring and the seal carrier are vented to prevent damage to the backup ring. In some embodiments, internal pieces of the seal carrier are loaded from the rear and held in place with a press fit plug (instead of, e.g., being loaded from the front and held in place with a retainer ring). In such embodiments, a backup ring with a larger outer diameter can be used, eliminating the unpredictability of the retainer ring and providing a cleaner look. In some embodiments, the seal material is retracted within the seal carrier (e.g., as compared with past designs using a thin-walled "nose" portion shown and discussed below), reducing lateral stresses applied to the seal carrier during pump operation and enhancing the fatigue life of the seal carrier.

In one aspect, the invention features a seal assembly for a high pressure liquid system. The seal assembly includes a seal carrier. The seal carrier includes a base portion defining a proximal end and a distal end. The seal carrier defines a bore. The seal assembly includes a seal disposed within the bore of the seal carrier. The seal assembly includes a backup ring disposed within the bore of the seal carrier. The seal assembly includes a hoop ring disposed substantially between the seal and the backup ring. The hoop ring has a proximal surface and an outer surface (e.g., a surface defining an outer diameter).

In some embodiments, the backup ring is in physical contact with the seal. In some embodiments, a distal surface of the backup ring forms a first angle with a proximal surface of the seal. In some embodiments, the first angle is between about zero and about eight degrees. In some embodiments, the seal assembly includes a press fit plug disposed in the bore of the seal carrier. The press fit plug can contact the backup ring and/or can be oriented proximally to the backup ring. In some embodiments, the press fit plug includes a distal surface in contact with the backup ring. In some embodiments, a proximal surface of the backup ring forms a second angle with the distal surface of the press fit plug. In some embodiments, a sum of the first and second angles is between about zero and about eight degrees.

In some embodiments, a proximal surface of the backup ring forms an angle with respect to a vertical plane. In some embodiments, a distal surface of the backup ring forms an angle with respect to a vertical plane. In some embodiments, a press fit plug is disposed in the bore of the seal carrier. In some embodiments, the press fit plug contacts the backup ring and/or is oriented proximally to the backup ring. In some embodiments, a distal surface of the press fit plug forms an angle with respect to a vertical plane. In some embodiments, a proximal surface of the backup ring forms an angle with a distal face of the press fit plug. In some embodiments, any angle with respect to a vertical plane can be between about zero and about eight degrees. In some embodiments, a sum of any of the angles made with respect to a vertical plane can be between about zero and about eight degrees.

In some embodiments, the high pressure liquid system is a liquid jet cutting system. In some embodiments, the seal assembly includes an o-ring disposed between a portion of the seal carrier and the seal. In some embodiments, the distal end of the seal carrier includes a tapered portion and the o-ring is located in the tapered portion of the seal carrier. In some embodiments, the backup ring is disposed in a counterbore in the bore of the seal carrier. In some embodiments, the hoop ring comprises a metal. In some embodiments, the backup ring comprises a metal. In some embodiments, the seal comprises an ultra-high molecular weight (UHMW) material.

In some embodiments, the press fit plug includes a chamfered surface. In some embodiments, the hoop ring has a triangular cross-section. In some embodiments, an outer diameter of the backup ring does not contact the seal carrier. In some embodiments, the backup ring has a clearance relative to an outer diameter of a plunger inserted within the bore of the seal carrier. In some embodiments, the seal carrier defines a vent path fluidly connecting an aperture of the seal carrier with an exterior surface in a low-pressure region of the seal carrier.

In some embodiments, the vent path includes an annular groove in the seal carrier. In some embodiments, the distal end of the seal carrier includes a sealing surface. In some embodiments, the distal end includes a tapered portion including the seating surface, the sealing surface including a departing angle of at least about two degrees. In some embodiments, an axial length of the seal assembly is less than about 0.75 inches.

In another aspect, the invention features a seal component for a seal assembly of a high pressure liquid system. The seal component includes a body defining a substantially cylindrical aperture. The body includes at least one of a first axial surface defining an outer diameter, a second axial surface defining an inner diameter, a third surface for engaging at least one of a press fit plug or a seal carrier, and a fourth surface for engaging at least one of a seal or a hoop ring when exposed to a pressure load. At least a portion of the second circumferential surface is angled relative to a vertical plane. In some embodiments, the seal component is a backup ring. In some embodiments, the fourth surface is angled radially outward. In some embodiments, the fourth surface is angled between about two and about ten degrees.

In another aspect, the invention features a method of locating a seal and a seal component in a seal assembly having a base portion defining a proximal end and a distal end. The method includes inserting, through an opening in the proximal end of the seal assembly, the seal into the seal assembly. The method includes placing, through the opening in the proximal end of the seal assembly, the seal component in contact with the seal within the seal assembly. The method includes securing the seal and the seal component in the seal assembly using a fastening component provided through the opening in the proximal end of the seal assembly.

In some embodiments, the seal component is at least one of a seal or a hoop ring. In some embodiments, the alignment surface is a distal surface of a press fit plug disposed in the seal assembly. In some embodiments, a pressure stroke of the liquid pressurization pump causes angular deformation of the seal component. In some embodiments, the method includes venting, through a seal carrier of the seal assembly, at least one of seal material or water that leaks relative to the seal component. In some embodiments, the venting occurs at least in part through an annular groove in the seal carrier.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1:
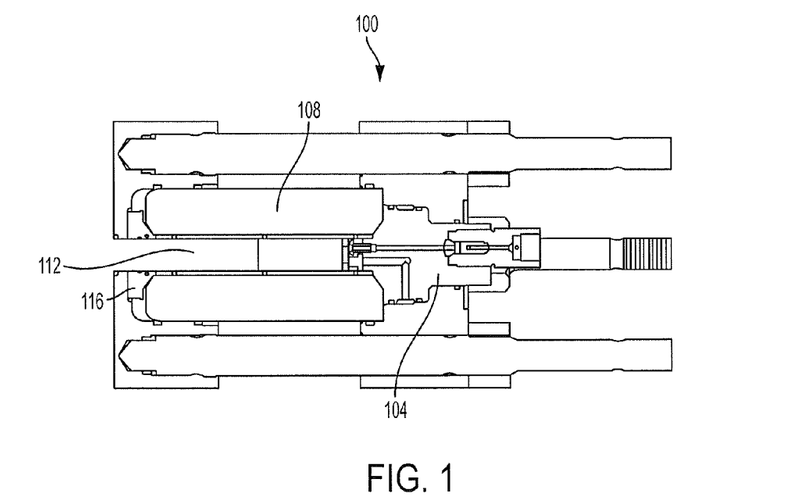
FIG. 1 is a close-up schematic illustration of a section of a high-pressure intensifier pump for a liquid pressurization system.

FIG. 1 is a close-up schematic illustration of a high-pressure intensifier pump 100 for a liquid pressurization system. The intensifier pump 100 includes a check valve 104, a pressurization cylinder 108, a plunger 112 and a seal assembly 116. The intensifier pump 100 draws liquid (e.g., filtered water) in through the check valve 104 and into the pressurization cylinder 108 on an intake stroke of the plunger 112. As the intensifier pump 100 cycles, the plunger 112 reciprocates within a bore of the seal assembly 116. To prevent fluid from leaking from the cylinder 108 into the intensifier pump 100, the seal assembly 116 forms a "dynamic" seal around the plunger 112 (e.g., as shown and described in detail below in FIGS. 3-6). In some embodiments, the seal assembly 116 also forms a metal-to-metal seal with the cylinder 108 to prevent leakage within the intensifier pump 100. A pump may have multiple cylinders, with pressurized fluid from cylinder collected in an accumulator (not shown).

Figure 2:
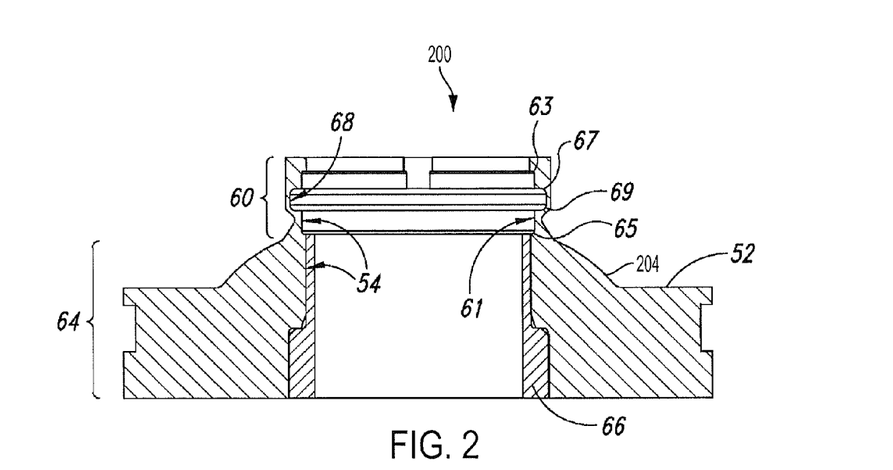
FIG. 2 is a schematic illustration of a prior art seal assembly having a bearing with a positional constraint relative to a hard seal contact point.

FIG. 2 is a schematic illustration of a prior art seal assembly 200 shown and described in FIG. 8 of U.S. Pat. No. 7,568,424, which is owned by Flow International Corporation. The prior art seal assembly 200 includes a seal carrier 52, a bearing 66, and a hard seal contact point 204. The bearing 66 is press-fitted into the seal carrier 52, e.g., to prevent the seal material from extruding between an outer diameter of the bearing 66 and an inner diameter of the seal carrier 52. When installed in an intensifier pump, the seal carrier 52 forms a metal-to-metal seal with the high pressure cylinder, causing a compressive force to be applied to the seal carrier 52 at the hard seal contact point 204. This force is transmitted through the seal carrier 52 to the bearing 66, causing the inner diameter of the bearing 66 to collapse around the outer diameter of the plunger and to close a seal material extrusion gap between the inner diameter of the bearing 66 and the outer diameter of the plunger.

The seal assembly 200 suffers from significant drawbacks. First, the seal assembly 200 has a constraint on the axial position of the bearing 66 relative to the hard seal contact point 204, thus preventing a more compact design from being achieved. In addition, the seal is held in a thin-walled "nose" (e.g., element 60 as shown) of the seal assembly. This thin-walled construction can crack rapidly when exposed to the significant lateral stresses placed upon this member during operation of the intensifier pump.

Figure 3:
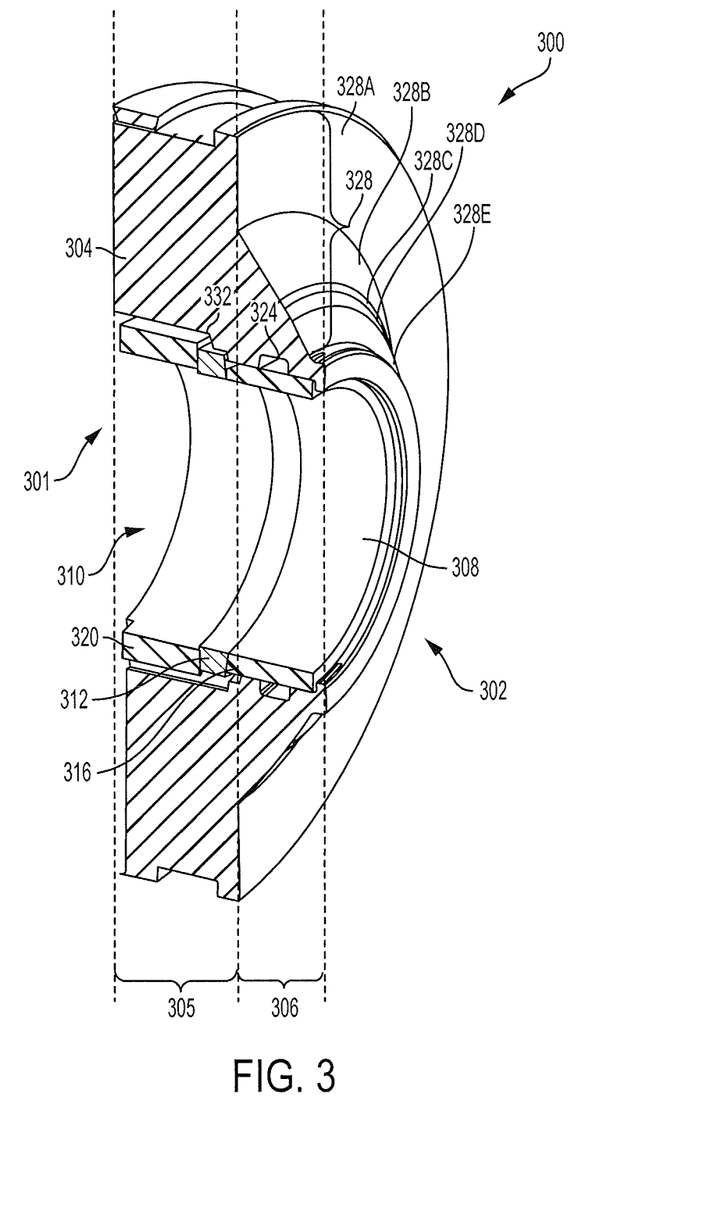
FIG. 3 is a front-perspective, half-sectional schematic illustration of a seal assembly, according to an illustrative embodiment of the invention.

FIG. 3 is a front-perspective, half-sectional schematic illustration of a seal assembly 300, according to an illustrative embodiment of the invention. The seal assembly 300 has a proximal end 301 and a distal end 302. The proximal end 301 can define a vertical plane (or, in some embodiments, can define another shape, e.g. a taper). The seal assembly 300 includes a seal carrier 304 having base portion 305 and a distal end or portion 306 (e.g., a tapered portion), a seal 308, a backup ring 312, and a hoop ring 316. The seal carrier 304 defines a bore 310, which can be substantially cylindrical. The seal 308 is disposed within the bore 310 of the seal carrier 304. The backup ring 312 is disposed within the bore 310 of the seal carrier 304 and is optionally in physical contact with the seal 308. The hoop ring 316 is disposed substantially between the seal 308 and the backup ring 312. In some embodiments, the hoop ring 316 has a proximal surface 317 and a surface defining an outer diameter 318 (e.g., as shown below in FIG. 4).

In some embodiments, the seal carrier 304 has an annular groove 324 in the bore 310. The annular groove 324 can receive an o-ring that provides a water-tight seal between the seal carrier 304 and the seal 308. In some embodiments, the o-ring is located in the distal (e.g., tapered) portion 306 of the seal carrier 304. In some embodiments, the seal carrier 304 has a surface 328 for mating to a pump cylinder (e.g., the cylinder 108 shown and described above in FIG. 1) of an intensifier pump (e.g., the intensifier pump 100 shown and described above in FIG. 1), forming a metal-to-metal seal.

In some embodiments, the surface 328 is divided into subsections 328A-328E, which can be tapered at distinct angles to each other. In some embodiments, one or more of the surfaces 328A-E form a departing angle of at least about two degrees with respect to a pump cylinder. In some embodiments, the surface 328C includes a cone angle that matches a mating cone angle on a pump cylinder. In some embodiments, the surfaces 328B and 328D have cone angles that depart from the cone angle (and/or the mating cone angle), e.g., by about two degrees. In some embodiments, a "departing angle" threes a hard seal between the cylinder and the seal carrier 304 to occur at a diameter defined by surface 328C. In some embodiments, if the departing angle (s) is (are) too large (e.g., are about five degrees), the surface 328C will "dig" into the cylinder, causing permanent plastic deformation of the cylinder mating face. In some embodiments, if a departing angle(s) is (are) too small (e.g. are about one degree) a contact force will not be localized enough to form a seal, and a hard seal between the cylinder and the seal carrier 304 can leak. In some embodiments, a departing angle is between about two and about ten degrees.

In some embodiments, the seal carrier 304 has a counter-bore 332 for receiving the backup ring 312. In some embodiments, the counter-bore 332 is a groove. In some embodiments, the backup ring 312 does not contact the seal carrier 304 (e.g., the backup ring 312 "floats" freely in the seal carrier 304). In some embodiments, the hoop 316 rests entirely on the face of the backup ring 312, strengthening the backup ring 312 and removing localized stress from the backup ring 312. In some embodiments, the seal assembly 300 includes a press fit plug 320. The press fit plug 320 holds the internal pieces (e.g., the seal 308, the backup ring 312, and the hoop ring 316) in place within the seal carrier 304. In some embodiments, the press fit plug 320 contacts the backup ring 312. In some embodiments, the press fit plug 320 is oriented proximally to the backup ring 312. In some embodiments, the backup ring 312 has a clearance relative to an outer diameter of a plunger inserted within the bore 310 of the seal carrier 304. In some embodiments, the seal 308 is made from a plastic material, e.g., an ultrahigh molecular weight (UHMW) plastic. In some embodiments, the hoop ring 316 comprises a metal. In some embodiments, the backup ring 312 comprises a metal alloy, for example bronze or a bronze alloy. In some embodiments, the press fit plug 320 includes a chamfered surface.

Figure 4:
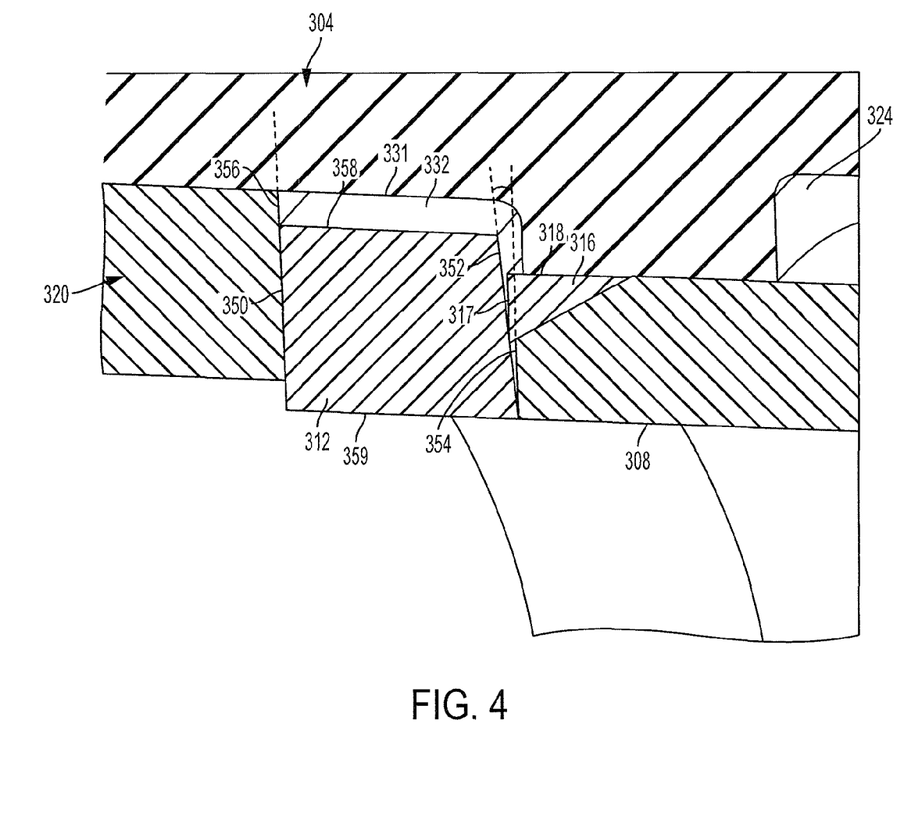
FIG. 4 is a close-up schematic illustration of a seal assembly (e.g., the seal assembly shown in FIG. 3), according to an illustrative embodiment of the invention.

FIG. 4 is a close-up schematic illustration of a seal assembly (e.g., the seal assembly 300 shown in FIG. 3), according to an illustrative embodiment of the invention. The backup ring 312 has an outer diameter 358, an inner diameter 359, a proximal surface 350 and a distal surface 352. The press fit plug 320 has a distal surface 356, and the seal 308 has a proximal surface 354. In this view, the backup ring 312 does not maintain direct physical contact with the seal carrier 304, e.g., "floats freely" in the seal carrier 304. The distal surface 352 of the backup ring 312 forms a first angle with the proximal surface 354 of the seal 308. The proximal surface 350 of the backup ring 312 forms a second angle with the distal surface 356 of the press fit plug 320.

In some embodiments, the distal surface 352 of the backup ring 312 is angled with respect to an axial plane (e.g., the vertical plane 303 shown above in FIG. 3). During the intensifier pump stroke, the angle facilitates compression of the backup ring 312 as it closes around the plunger. This "pressure activating backup ring" can help minimize seal material extrusion between the plunger and the backup ring 312, allowing seal life to be extended. The metal hoop 316 also minimizes extrusion of seal material by providing a buffer between the seal carrier 304 (e.g., an inner diameter of the seal carrier 304), the backup ring 312 (e.g., an outer diameter of the backup ring 312), and the seal 308.

In some embodiments, one or more of the following surfaces is angled (e.g., with respect to the vertical plane 303 as shown and described above): the distal surface 356 of the press fit plug 320, the proximal surface 350 of the backup ring 312, and/or the distal surface 352 of the backup ring 312. In some embodiments, the effects of angling the distal surface 352 of the backup ring 312 can be achieved by angling one or more of the surfaces 350, 352, 356. One skilled in the art will readily appreciate that the sum of the first and the second angles can be adjusted by appropriately angling any of these surfaces. In some embodiments, the first angle is between about zero and about eight degrees, optionally between about three and about five degrees, optionally about four degrees. In some embodiments, the second angle is about or exactly zero degrees (e.g., as shown in FIG. 4). In some embodiments, the sum of the first and second angles is between about zero and about eight degrees, optionally between about three to about five degrees, optionally about four degrees. In some embodiments, the proximal surface 350 is a surface for engaging (e.g., sealingly engaging) at least one of a press fit plug or a seal carrier. In some embodiments, the distal surface 352 is a surface for engaging (e.g., sealingly engaging) at least one of a seal or a hoop ring when exposed to a pressure load. In some embodiments, the proximal surface 350 surface is angled radially outward. In some embodiments, the distal surface is angled between about two and about ten degrees. Further illustrative embodiments for angling surfaces in different combinations are shown below in FIGS. 10A-10F.

In some embodiments, the counter-bore 332 has a rounded corner. In some embodiments, the counter-bore 332 has a clearance of about 0.29 inches diametrically between the outer diameter 358 of the backup ring 312 and the surface 331 of the seal carrier 304. In some embodiments, the outer diameter 358 does not contact the seal carrier 304. In some embodiments, the hoop ring 316 has a triangular cross-section (e.g., as shown in FIG. 4). In some embodiments, the proximal surface 317 of the hoop ring 316 and the surface defining the outer diameter 318 form two legs of a right triangle (e.g., as shown in FIG. 4 in cross-section).

Figure 5:
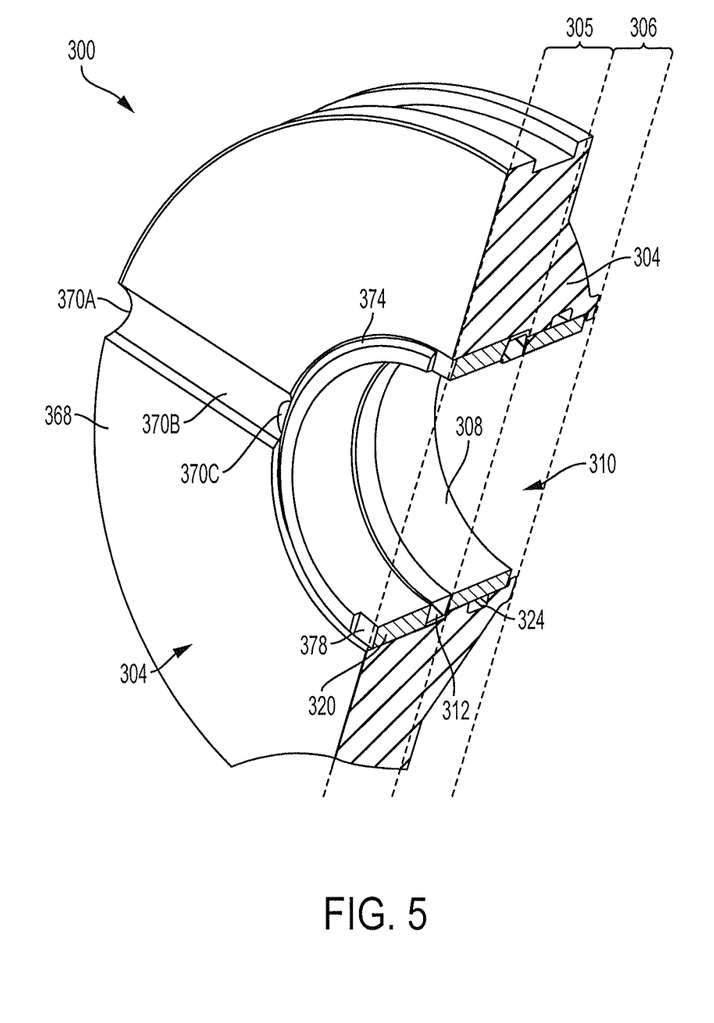
FIG. 5 is a rear-perspective, half-sectional schematic illustration of a seal assembly (e.g., the seal assembly shown in FIG. 3), according to an illustrative embodiment of the invention.

FIG. 5 is a rear-perspective, half-sectional schematic illustration of a seal assembly (e.g., the seal assembly 300 shown above in FIG. 3), according to an illustrative embodiment of the invention. The base portion 305 has a bottom face 368. The bottom face 368 includes grooves 370A-C, 374, 378. One or more of the grooves 370A-C, 374, 378 can assist in venting extruded seal material and water that leak between the backup ring 312 and the seal carrier 304 and/or that leak between the backup ring 312 and a plunger (e.g., to prevent damage to the backup ring 312.) In some embodiments, the groove 370B is in the shape of a half-cylinder. In some embodiments, the groove 370A is located at or near one end of the groove 370B, e.g., on a rear face of the seal carrier 304. In some embodiments, the groove 370C is located at or near an opposite end of the groove 370B, e.g., toward the bore 310 of the seal carrier 304. In some embodiments, the groove 370 is centered along a diameter of the bottom face 368 of the seal carrier 304. In some embodiments, one or more of the grooves 370, 374, 378 form a vent path fluidly connecting an aperture of the seal carrier 304 with an exterior surface in a low pressure region of the seal carrier 304. In some embodiments, the groove 374 is an annular groove.

Figure 6:
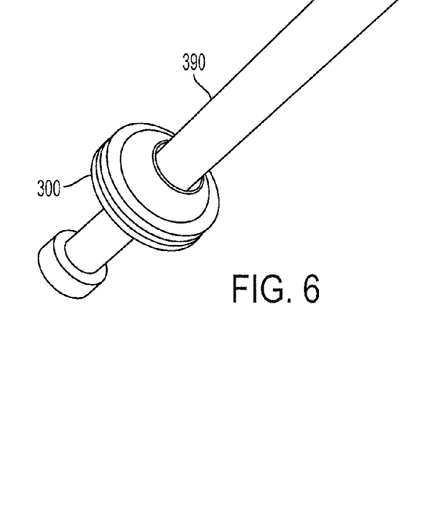
FIG. 6 is a side-perspective view of a compact, ultrahigh pressure seal assembly (e.g., the seal assembly shown in FIG. 3) with a plunger inserted through the bore of the seal assembly, according to an illustrative embodiment of the invention.

FIG. 6 is a side-perspective view of a compact, ultrahigh pressure seal assembly (e.g., the seal assembly 300 shown above in FIG. 3) with a plunger 390 inserted through the bore 310 of the seal assembly 300, according to an illustrative embodiment of the invention. The backup ring (e.g., the backup ring 312 shown and described above) has a clearance relative to an outer diameter of the plunger 390, promoting ease of assembly. In some embodiments, the clearance is about 0.001 inches diametrically.

Figure 7:
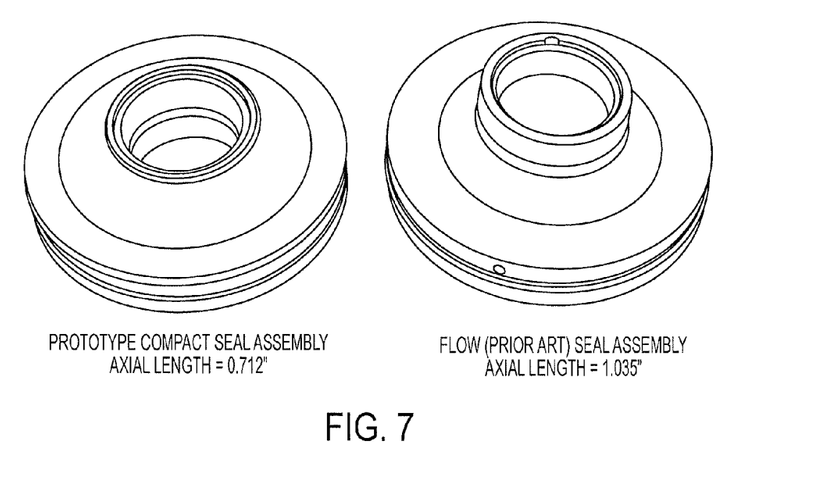
FIG. 7 is a perspective view of a compact, ultrahigh pressure seal assembly (e.g., the seal assembly shown in FIG. 3) (left), according to an illustrative embodiment of the invention, beside a prior art seal assembly (right) manufactured by Flow International Corporation.

FIG. 7 is a perspective view of a compact, ultrahigh pressure seal assembly (e.g., the seal assembly 300 shown in FIG. 3) (left), according to an illustrative embodiment of the invention, beside a prior art seal assembly (right) manufactured by Flow International Corporation. The left seal assembly eliminates the position constraint of the right seal assembly (e.g., with respect to the position of the backup ring relative to the seal carrier hard seal contact point, as shown and described above in FIG. 2). The left seal assembly can have an axial length of less than 0.75 inches, for example about 0.71 inches, whereas the right seal assembly has an axial length of over one inch, or about 1.04 inches. In addition, in the left seal assembly, the seal is pulled back within the body of the seal assembly relative to the pump cylinder. In some embodiments, eliminating the thin-walled "nose" portion of the right seal carrier can enhance the fatigue life of the seal carrier. In some embodiments, the left seal assembly has a shorter overall axial length, a more compact seal assembly design, and/or a lower cost of goods sold. Ratios of certain linear and circumferential dimensions in some embodiments are further shown and described below in FIGS. 10A-10C.

Figure 8:
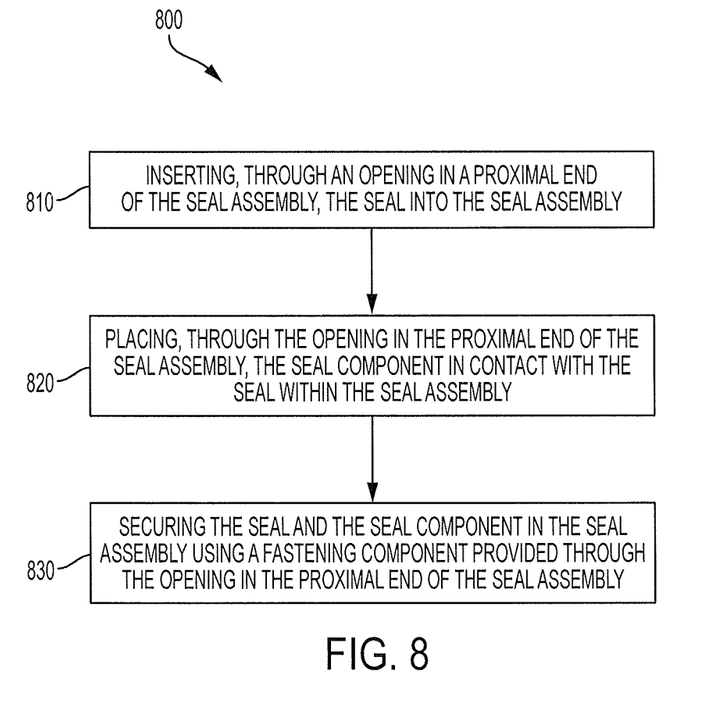
FIG. 8 is a schematic illustration of a method of locating a seal and a seal component in a seal assembly, according to an illustrative embodiment of the invention.

FIG. 8 is a schematic illustration of a method 800 of locating a seal and a seal component in a seal assembly (e.g., the seal assembly 300 as shown and described above), according to an illustrative embodiment of the invention. The method 800 includes a first step 810 of inserting, through an opening in a proximal end of the seal assembly, the seal into the seal assembly. The method 800 includes a second step 820 of placing, through the opening in the proximal end of the seal assembly, the seal component in contact with the seal within the seal assembly. The method 800 includes a third step 830 of securing the seal and the seal component in the seal assembly using a fastening component provided through the opening in the proximal end of the seal assembly. The steps 810, 820 and 830 do not necessarily occur in chronological order, but are labeled as "first," "second" and "third," respectively, for convenience of reference.

In some embodiments, the fastening component of the method 800 is a press fit plug. In some embodiments, the method 800 further includes inserting a plunger within a bore of the seat assembly, e.g., through the proximal or the distal end of the seal assembly. In some embodiments, the method 800 includes energizing the seal component via a pressure stroke of the plunger. In some embodiments, the energizing causes angular deformation of the seal component. In some embodiments, a position of the seal within the tapered portion of the seal assembly substantially counteracts outward stresses on the seal during the pressure stroke. In some embodiments, the method 800 includes venting, through a seal carrier of the seal assembly, at least one of seal material or water that leak between an outer diameter of the seal component and an inner diameter of the seal carrier. In some embodiments, the venting occurs at least in part through an annular groove in the seal carrier. In some embodiments, the seal is located at least substantially in the tapered portion of the seal assembly.

In some embodiments, the force includes a tangential component, the tangential component causing the seal component to rotate within the seal assembly. In some embodiments, the tangential component facilitates alignment of the seal component within the seal assembly. In some embodiments, the seal component is at least one of a seal or a hoop ring. In some embodiments, the alignment surface is a distal surface of a press fit plug disposed in the seal assembly. In some embodiments, the pressure stroke of the liquid pressurization pump causes angular deformation of the seal component. In some embodiments, the method 900 further includes venting, through a seal carrier of the seal assembly, at least one of seal material or water that leaks relative to the seal component. In some embodiments, venting occurs at least in part through an annular groove in the seal carrier.

Figure 9A:
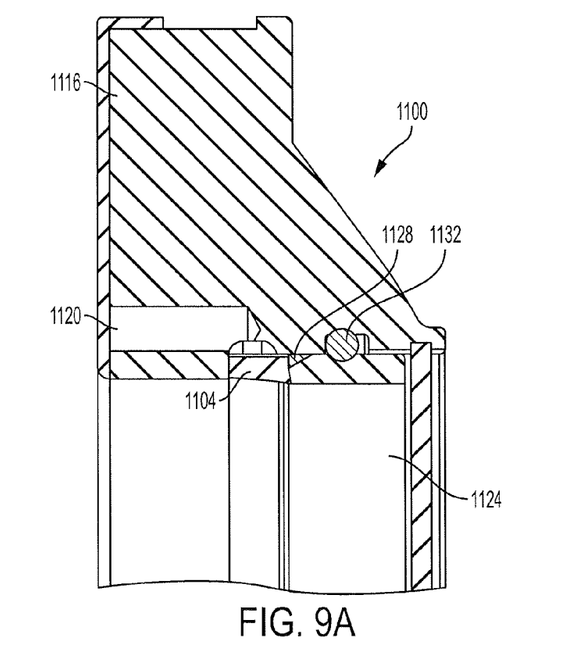
FIGS. 9A-B are close-up cross-sectional views of a seal assembly having a backup ring with a knife edge having an angled portion, according to an illustrative embodiment of the invention.
Figure 9B:
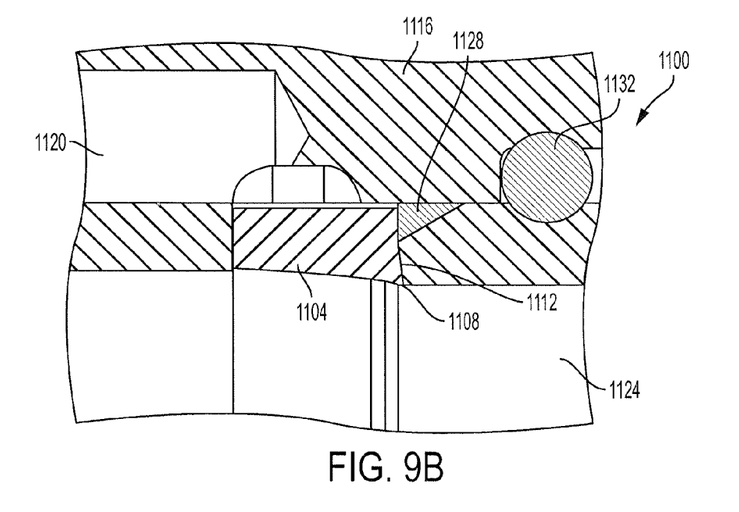

FIGS. 9A-B are close-up cross-sectional views of a seal assembly 1100 having a backup ring 1104 with a knife edge 1108 (see FIG. 9B) having an angled portion 1112 (see FIG. 9B), according to an illustrative embodiment of the invention. The seal assembly 1100 can contain similar component parts as the seal assemblies shown and described herein, e.g., a seal carrier 1116, a seal carrier vent 1120, a seal 1124, a metal hoop 1128, and/or an o-ring 1132. In some embodiments, the knife edge 1108 of the backup ring 1104 includes an angled portion 1112 that mates with the seal 1124. Such a design allows the knife edge 1108 to close around an outer diameter of a reciprocating plunger when the seal assembly 1100 is exposed to ultrahigh fluid pressure during a pressure stroke of an intensifier pump. In some embodiments, the backup ring 1104 helps to minimize seal material extrusion between the plunger and the knife edge 1108 of the backup ring 1104, allowing seal life to be extended. In some embodiments, the metal hoop 1128 minimizes extrusion of seal material between the seal carrier 1116 and the backup ring 1104. In some embodiments, seal material and water that leak between the backup ring 1104 and the seal carrier 1116 are vented to prevent damage to the backup ring 1104 (e.g., similarly as shown and described above in FIG. 5).

Figure 10A:
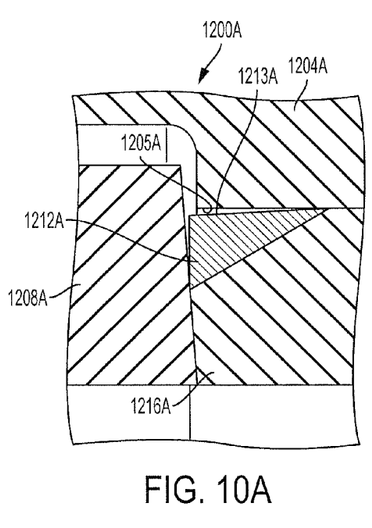
FIGS. 10A-10F are close-up cross-sectional schematic illustrations of seal assemblies (e.g., alternative configurations to the seal assembly shown in close-up in FIG. 4), according to illustrative embodiments of the invention.
Figure 10B:
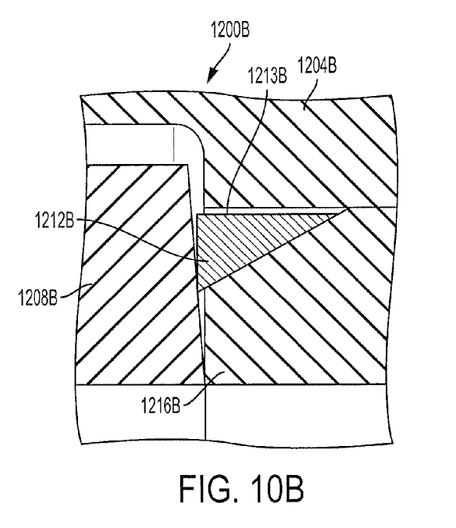

FIGS. 10A-10F are close-up cross-sectional schematic illustrations of seal assemblies 1200A-F (e.g., alternative configurations to the seal assembly shown in close-up in FIG. 4), according to illustrative embodiments of the invention. The seal assemblies 1200A-F include seal carriers 1204A-F, backup rings 1208A-F, hoop rings 1212A-F, and seals 1216A-F, e.g., similar to corresponding component parts shown and described above. In FIG. 1.0A, the hoop ring 1212A has an outer diameter 1213A that is angled with respect to the seal carrier 1204A. In FIG. 10B, the hoop ring 1212B has an outer diameter 1213B that is not angled (or is "flat") with respect to the seal carrier 1204B. In some embodiments, the angled outer diameter 1213A redistributes a contact force between the hoop ring 1211A and the seal carrier 1204A away from a corner 1205A of the seal carrier 1204A. In some embodiments, an angle formed between the seal carrier 1204A and the hoop ring 1212A is about three degrees.

Figure 10C:
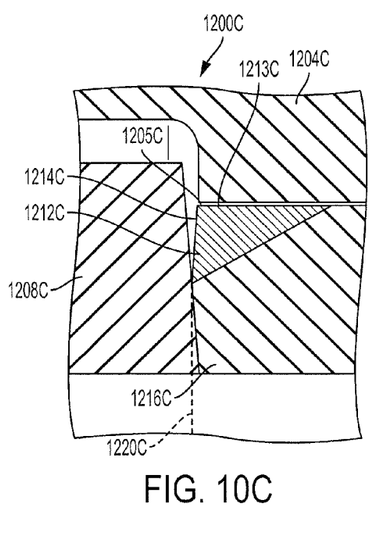
Figure 10D:
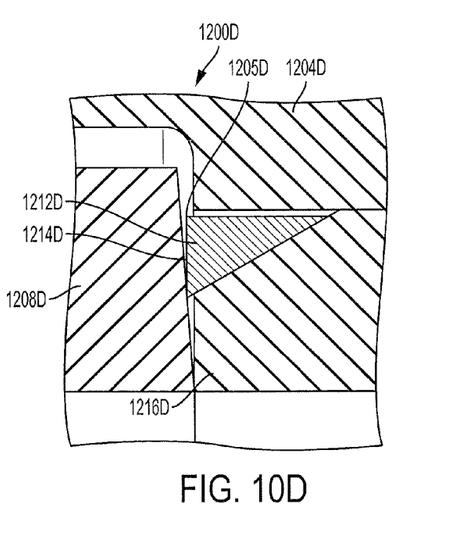
Figure 10E:
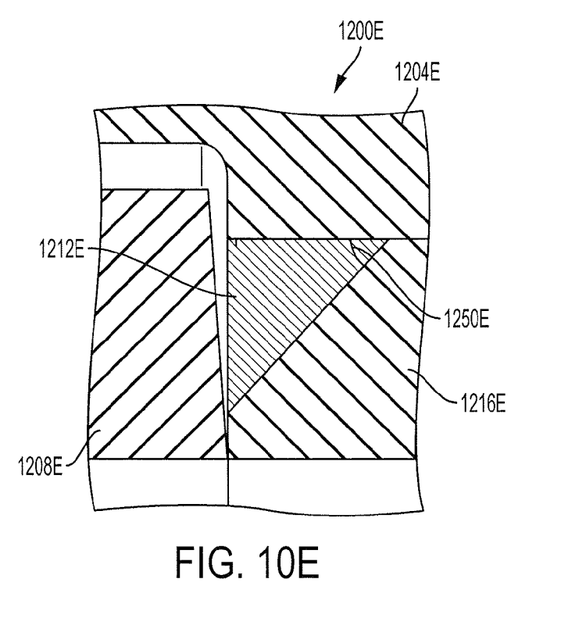
Figure 10F:
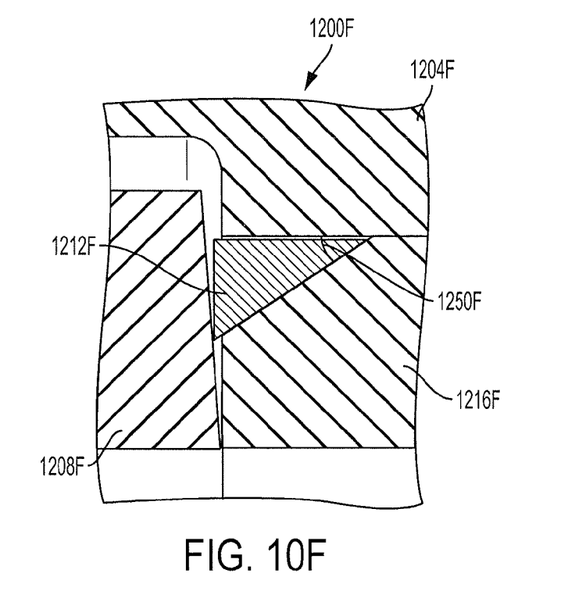

In FIG. 10C, the hoop ring 1212C has a back surface 1214C that is angled with respect to the backup ring 1208C. In FIG. 10D, the hoop ring 1212D has a back surface 1214D that is not angled (or is "flat") with respect to the backup ring 1208D. In some embodiments, the angled back surface 1214C shills the hoop ring 1212C forward such that an outer diameter 1213C of the hoop ring 1212C cannot "wrap around" a corner 1205C of the seal carrier 1204C. In some embodiments, an angle formed between the angled back surface 1214C of the hoop ring 1212C and a reference plane 1220C is about three degrees. In FIG. 10E, the hoop ring 1212E has an angle 1250E of about 45 degrees. In FIG. 10F, the hoop ring 1212F has an angle 1250F of about 30 degrees. In some embodiments, the hoop ring 1212E having the 45 degree angle 1250E results in a greater cross-sectional area of the hoop ring 1212E, adding more substance to the hoop ring 1212E as compared with the hoop ring 1212F. In some embodiments, the hoop ring 1212F having the 30 degree angle 1250F with less substance has increased flexibility by comparison to the hoop ring 1212E. In some embodiments, the backup ring 1208A-F has a flat face instead of an angled face, and/or may include a contour that improves or assists loading of the backup ring 1208A-F onto the plunger.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A seal assembly for a high pressure liquid system, the seal assembly comprising:
   a seal carrier including a base portion defining a proximal end and a distal end, the seal carrier defining a bore and having a surface for mating to a pump cylinder, the pump cylinder having a plunger for pressurizing a volume of liquid within a bore of the pump cylinder on a pressure stroke;
   a seal disposed within the bore of the seal carrier;
   a backup ring disposed within the bore of the seal carrier;
   a hoop ring disposed-between the seal and the backup ring, the hoop ring having a proximal surface and an outer surface;
   an o-ring disposed between a portion of the seal carrier and the seal,
   wherein the distal end of the seal carrier includes a tapered portion and the o-ring is located in the tapered portion of the seal carrier.

2. The seal assembly of claim 1 wherein the backup ring is in physical contact with the seal.

3. The seal assembly of claim 1 wherein a distal surface of the backup ring forms a first angle with a proximal surface of the seal.

4. The seal assembly of claim 3 wherein the first angle is between about one and about eight degrees.

5. The seal assembly of claim 3 further including a press fit plug disposed in the bore of the seal carrier, the press fit plug contacting the backup ring and oriented proximally to the backup ring.

6. The seal assembly of claim 5 wherein the press fit plug includes a distal surface in contact with the backup ring.

7. The seal assembly of claim 5 wherein a proximal surface of the backup ring forms a second angle with the distal surface of the press fit plug.

8. The seal assembly of claim 7 wherein a sum of the first and second angles is between about zero and about eight degrees.

9. The seal assembly of claim 1 wherein a proximal surface of the backup ring forms an angle with respect to a vertical plane.

10. The seal assembly of claim 9 further including a press fit plug disposed in the bore of the seal carrier.

11. The seal assembly of claim 1 wherein a distal surface of the backup ring forms an angle with respect to a vertical plane.

12. The seal assembly of claim 11 further including a press fit plug disposed in the bore of the seal carrier.

13. The seal assembly of claim 1 further including a press fit plug disposed in the bore of the seal carrier.

14. The seal assembly of claim 13 wherein a distal surface of the press fit plug forms an angle with respect to a vertical plane, the press fit plug contacting the backup ring and oriented proximally to the backup ring.

15. The seal assembly of claim12 wherein a proximal surface of the backup ring forms an angle with a distal face of the press fit plug.

16. The seal assembly of claim 1 wherein the high pressure liquid system is a liquid jet cutting system.

17. The seal assembly of claim 1 wherein the backup ring is disposed in a counter-bore in the bore of the seal carrier.

18. The seal assembly of claim 1 wherein the hoop ring comprises a metal.

19. The seal assembly of claim 1 wherein the backup ring comprises a metal.

20. The seal assembly of claim 5 wherein the press fit plug includes a chamfered surface.

21. The seal assembly of claim 1 wherein the hoop ring has a triangular cross-section.

22. The seal assembly of claim 1 wherein an outer diameter of the backup ring does not contact the seal carrier.

23. The seal assembly of claim 1 wherein the backup ring has a clearance relative to an outer diameter of a plunger inserted within the bore of the seal carrier.

24. The seal assembly of claim 1 wherein the seal carrier defines a vent path fluidly connecting an aperture of the seal carrier with an exterior surface in a low-pressure region of the seal carrier.

25. The seal assembly of claim 24 wherein the vent path includes an annular groove in the seal carrier.

26. The seal assembly of claim 1 wherein the distal end of the seal carrier includes a sealing surface.

27. The seal assembly of claim 26 wherein the distal end includes a tapered portion including the sealing surface, the sealing surface including a departing of between about two and about ten degrees.

28. The seal assembly of claim 1 wherein an axial length of the seal assembly is less than about 0.75 inches.

* * * * *